J. C. BUTTERFIELD.
WHEEL ATTACHMENT.
APPLICATION FILED SEPT. 14, 1909.
967,723.
Patented Aug. 16, 1910.
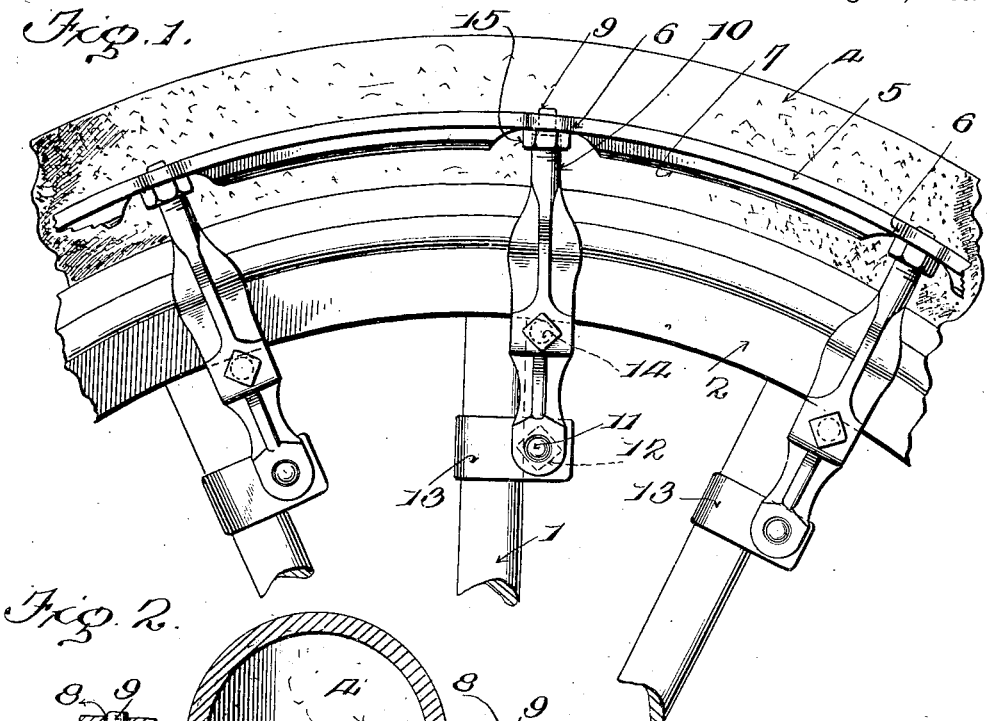
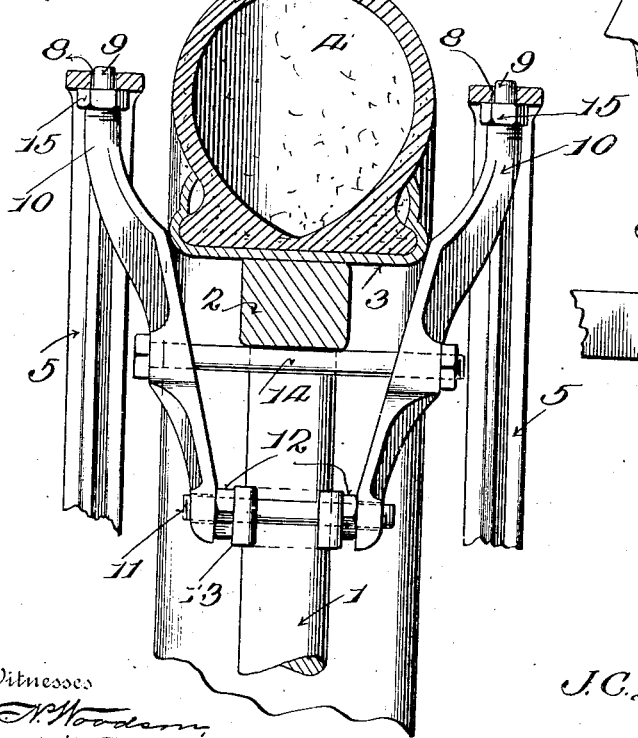
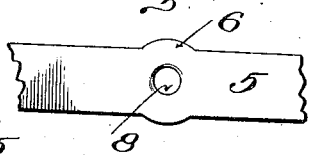
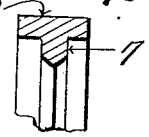
Witnesses
Inventor
J. C. Butterfield,
By ———, Attorneys.

UNITED STATES PATENT OFFICE.

JOHN C. BUTTERFIELD, OF BELMOND, IOWA.

WHEEL ATTACHMENT.

967,723.

Specification of Letters Patent. Patented Aug. 16, 1910.

Application filed September 14, 1909. Serial No. 517,684.

*To all whom it may concern:*

Be it known that I, JOHN C. BUTTERFIELD, citizen of the United States, residing at Belmond, in the county of Wright and State of Iowa, have invented certain new and useful Improvements in Wheel Attachments, of which the following is a specification.

This invention comprehends certain new and useful improvements in attachments for the wheels of automobiles, or other self-propelled vehicles, and said invention consists in certain constructions, arrangements and combinations of the parts that I shall hereinafter first describe and then point out the novel features, practical operation and advantages of the device, eventually concluding with a statement of the novel features and combinations thereof, which I claim to be new.

For a full understanding of the invention, reference is to be had to the following description and accompanying drawings in which:

Figure 1 is a side elevation of a portion of a wheel equipped with the improvements of my invention; Fig. 2 is a transverse sectional view thereof; Fig. 3 is a fragmentary view of a portion of one of the auxiliary rims hereinafter specifically described; and, Fig. 4 is a transverse sectional view thereof.

Corresponding and like parts are referred to in the following description and indicated in all the views of the accompanying drawings by the same reference characters.

Referring to the drawing, the numeral 1 designates several of the spokes, 2 the preferably wooden felly, 3 the metallic channeled rim secured in any desired way to the felly, and 4 the tire of a wheel equipped with the improvements of my invention, all of these parts being of any desired construction, arrangement or design.

In carrying out my invention, I have arranged on opposite sides of the tire 4, and spaced somewhat therefrom, as best shown in Fig. 2, two preferably cast auxiliary rims 5, said rims being, in properly applied position, preferably on a transverse plane intersecting the median line of the tire and being preferably slightly transversely enlarged at intervals as indicated at 6 and formed on their inner face between such enlarged portion with longitudinally extending ribs 7. In the enlarged portion 6 of the auxiliary rims or rings 5, openings 8 are formed. Substantially radially extending dowels or pins 9 project outwardly through the openings 8, said pins being formed on the outer ends of the brackets 10 that are arranged in transversely disposed pairs. The brackets 10 preferably curve inwardly toward each other from their outer ends and preferably contact with the opposite sides of the channeled rim 3 at the base thereof. And the inner ends of the brackets 10 are formed with openings by which they are adapted to be slipped over the ends of transversely extending bolts 11, bearing against the nuts 12 screwed on the threaded ends of said bolts. The bolts 11 pass through the ends of clips 13 which partially encircle the spokes 1, the nuts 12 securely clamping the clips to the spokes. At intermediate points in the corresponding brackets 10 openings are formed to receive a tie rod or bolt 14, nuts screwing on the ends of said bolts, and thereby holding the corresponding opposite brackets in rigid relation to each other and the wheel.

15 designates tension nuts which screw upon the threaded outer ends of the brackets 10 and which are adapted to bear against the inner edges of the auxiliary rims or rings 5 so as to properly tension the same after the blocks have been put in place.

In the practical application of my improved wheel attachment, the brackets 10 are clamped to the spokes as before set forth and are securely held in proper position by the clips 13 as well as by the tie-rods or bolts 14, it being understood that preparatory to the tightening of the brackets, the dowels 9 thereof are slipped outwardly through their corresponding openings 8 in the auxiliary rims or rings 5. The tension nuts 15 are then worked outwardly on the threaded outer ends of the brackets 10 so as to place the rings 5 properly under tension.

It is to be understood that my improved wheel attachment is designed for a plurality of purposes and possesses several advantages. For example, the attachment admits of an automobile or the like pulling itself over or through a mud hole in either of two ways, for instance by attaching one end of a rope to the rear or power wheels, and the other end to a stake in advance or ahead of the automobile in solid ground. As the engine is started and the rear wheels slip in the mud or sand, the rope will be wound in the groove which is formed between the brackets and the adjacent side of the channeled rim 3 thereby to all intents and purposes producing a windlass which will draw the vehicle ahead. As another application of the device, it is well known, that it sometimes happens that the front wheels are on solid ground while the rear wheels are in the mud or soft ground and slipping. In such an emergency, by winding the rope on the front wheels so as to unwind from the bottom and rear, and securing the loose end to the rear wheel and starting the engine, power is transmitted to the front wheels so as to draw the vehicle ahead. In addition to these functions, it is to be noted that the attachment also serves as a tire protector, the auxiliary rims or rings 5 being held in position by the brackets at about the center line of the tire acting as a fender for the tire while going through ruts or over the edges of narrow roads and thereby preventing considerable wear of the tire at the sides thereof. Or again, as an emergency tire, in case of a puncture while on the road, the rings 5 may be used in place of the regular tire, as they are nearly the diameter of the felly of the wheel.

It is to be understood that my invention is not limited to the exact construction, arrangement and proportions of the parts described and shown, as various changes may be made without departing from the scope of the invention as defined by the appended claims.

Having thus described the invention, what is claimed as new is:

1. The combination with a wheel embodying a rim, and a tire secured thereto, of rings spaced on opposite sides of said tire and extending circumferentially around the same, inwardly extending brackets secured at their outer ends to the rings and arranged in transversely disposed pairs, clips embracing the spokes of the wheel, bolts holding said clips in place and having projecting ends, the brackets being formed at their inner ends with openings by which they are slipped over the projecting ends of the bolts, and tie rods extending through correspondingly opposite brackets, intermediate the ends thereof, and arranged to hold the brackets against opposite sides of the rim and on the ends of the bolts.

2. The combination with a wheel and a tire mounted thereon, of rings arranged on opposite sides of the tire and extending circumferentially around the same, brackets connected to the wheel and extending substantially radially, the rings being formed at intervals with openings extending therethrough, and the brackets being formed at their outer ends with pins projecting outwardly through said openings.

3. The combination with a wheel and a tire mounted thereon, of rings mounted at opposite sides of said tire and extending circumferentially around the wheel, brackets secured to the wheel and extending outwardly therefrom, the rings being formed with openings, the brackets being formed at their outer ends with pins received in said openings, and lock nuts screwed on the outer ends of said brackets and arranged to tension the rings.

In testimony whereof I affix my signature in presence of two witnesses.

JOHN C. BUTTERFIELD. [L. S.]

Witnesses:
C. O. HECKLE,
ADA E. SPERRY.